United States Patent
Bodin et al.

(10) Patent No.: US 7,945,847 B2
(45) Date of Patent: *May 17, 2011

(54) RECASTING SEARCH ENGINE RESULTS AS A MOTION PICTURE WITH AUDIO

(75) Inventors: William K. Bodin, Austin, TX (US);
David Jaramillo, Lake Worth, FL (US);
Jesse W. Redman, Cedar Park, TX (US);
Derral C. Thorson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 956 days.

This patent is subject to a terminal disclaimer.

(21) Appl. No.: 11/768,542

(22) Filed: Jun. 26, 2007

(65) Prior Publication Data
US 2009/0003800 A1    Jan. 1, 2009

(51) Int. Cl.
*G06N 3/00* (2006.01)
(52) U.S. Cl. ........................................................ 715/203
(58) Field of Classification Search .................. 715/200, 715/201, 202, 203, 204, 234, 243, 254
See application file for complete search history.

(56) References Cited

U.S. PATENT DOCUMENTS

| | | | |
|---|---|---|---|
| 6,362,850 B1 | 3/2002 | Alsing et al. | |
| 6,687,745 B1 | 2/2004 | Franco et al. | |
| 6,732,142 B1 | 5/2004 | Bates et al. | |
| 6,892,228 B1 | 5/2005 | Penders | |
| 7,152,057 B2 * | 12/2006 | Brill et al. | 1/1 |
| 7,653,748 B2 | 1/2010 | Border et al. | |
| 2002/0026507 A1 | 2/2002 | Sears et al. | |
| 2003/0063125 A1 | 4/2003 | Miyajima et al. | |
| 2003/0110117 A1 | 6/2003 | Saidenberg et al. | |
| 2004/0041835 A1 | 3/2004 | Lu | |
| 2005/0008343 A1 | 1/2005 | Frohlich et al. | |
| 2005/0055643 A1 | 3/2005 | Quimby | |

(Continued)

OTHER PUBLICATIONS

Wikipedia, Favicon, Jan. 25, 2007.

(Continued)

*Primary Examiner* — Kyle R Stork
(74) *Attorney, Agent, or Firm* — Biggers & Ohanian, PLLC

(57) ABSTRACT

Computer-implemented methods, systems, and computer program products are provided for recasting search engine results as a motion picture with audio. Embodiments include identifying a search engine query; providing to a search engine the query; receiving from the search engine the results of the query; retrieving a plurality of legacy web pages in dependence upon the results; identifying audio objects in the plurality of legacy web pages for audio rendering; identifying video objects in the plurality of legacy web pages for motion picture rendering; associating one or more of the video objects for motion picture rendering with one or more of the audio objects for audio rendering; determining in dependence upon the selected audio objects and video objects a duration for the motion picture; selecting audio events for rendering the audio objects identified for audio rendering; selecting motion picture video events for rendering the video objects identified for motion picture rendering; assigning the selected audio events and the selected motion picture video events to playback times for the motion picture; rendering, with the selected audio events at their assigned playback times, the audio content of the each of the audio objects identified for audio rendering; rendering, with the selected motion picture video events at their assigned playback times, the video content of the video objects identified for motion picture rendering; and recording in a multimedia file the rendered audio content and motion picture video content.

16 Claims, 8 Drawing Sheets

U.S. PATENT DOCUMENTS

| | | |
|---|---|---|
| 2005/0108754 A1 | 5/2005 | Carhart et al. |
| 2006/0136803 A1* | 6/2006 | Erol et al. ................... 715/500 |
| 2006/0206591 A1 | 9/2006 | Lucas et al. |
| 2007/0133609 A1 | 6/2007 | Moore et al. |
| 2007/0156525 A1 | 7/2007 | Grouf et al. |
| 2008/0021874 A1* | 1/2008 | Dahl et al. ..................... 707/3 |
| 2008/0163317 A1* | 7/2008 | Mills ........................ 725/109 |
| 2008/0309670 A1* | 12/2008 | Bodin et al. ................ 345/473 |
| 2010/0134587 A1* | 6/2010 | Grasso et al. ............. 348/14.01 |

OTHER PUBLICATIONS

Office Action Dated Jun. 24, 2009 in U.S. Appl. No. 11/763,599.

Final Office Action, U.S. Appl. No. 11/764, 600, USPTO Mail Date Oct. 6, 2010.

Office Action, U.S. Appl. No. 11/764,600, USPTO Mail Date May 17, 2010.

Final Office Action, U.S. Appl. No. 11/768,534, USPTO Mail Date Sep. 15, 2010.

Office Action, U.S. Appl. No. 11/768,534, USPTO Mail Date Apr. 30, 2010.

Final Office Action, U.S. Appl. No. 11/768,542, USPTO Mail Date Oct. 19, 2010.

Office Action, U.S. Appl. No. 11/768,542, USPTO Mail Date May 19, 2010.

* cited by examiner

RECASTING SEARCH ENGINE RESULTS AS A MOTION PICTURE WITH AUDIO

BACKGROUND OF THE INVENTION

1. Field of the Invention

The field of the invention is data processing, or, more specifically, methods, apparatus, and products for recasting search engine results as a motion picture with audio.

2. Description of Related Art

Many users enjoy content in web pages served up by web servers. Such content typically must be viewed through conventional web browsers installed on larger computer devices. While some users have portable devices with micro-browsers that allow a user to conveniently view web pages on those portable devices, even more users have portable digital media players and digital media applications for rendering multimedia files.

SUMMARY OF THE INVENTION

Computer-implemented methods, systems, and computer program products are provided for recasting search engine results as a motion picture with audio.

Embodiments include identifying a search engine query; providing to a search engine the query; receiving from the search engine the results of the query; retrieving a plurality of legacy web pages in dependence upon the results; identifying audio objects in the plurality of legacy web pages for audio rendering; identifying video objects in the plurality of legacy web pages for motion picture rendering; associating one or more of the video objects for motion picture rendering with one or more of the audio objects for audio rendering; determining in dependence upon the selected audio objects and video objects a duration for the motion picture; selecting audio events for rendering the audio objects identified for audio rendering; selecting motion picture video events for rendering the video objects identified for motion picture rendering; assigning the selected audio events and the selected motion picture video events to playback times for the motion picture; rendering, with the selected audio events at their assigned playback times, the audio content of the each of the audio objects identified for audio rendering; rendering, with the selected motion picture video events at their assigned playback times, the video content of the video objects identified for motion picture rendering; and recording in a multimedia file the rendered audio content and motion picture video content.

The foregoing and other features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Exemplary Architecture

Figure 1:
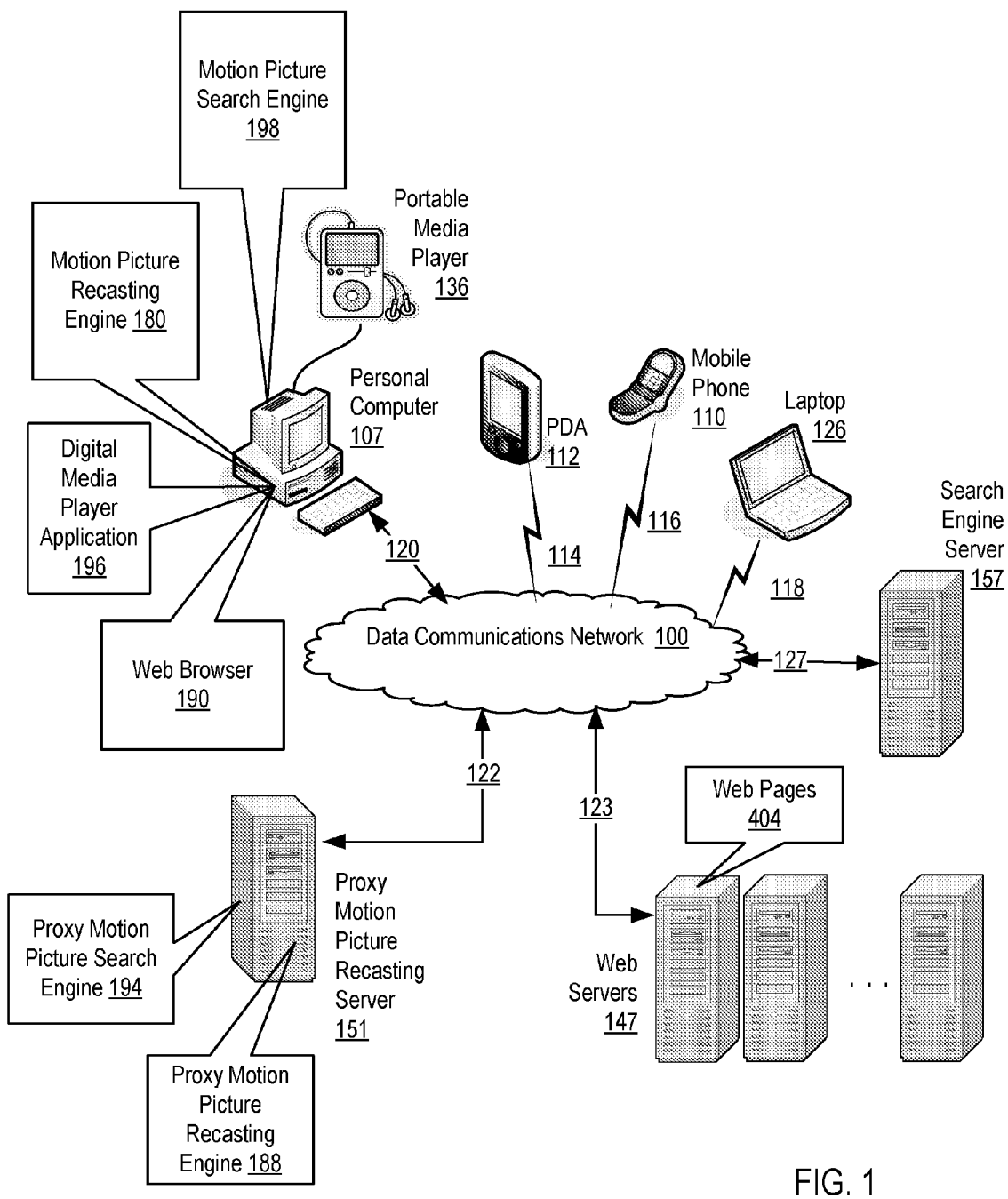
FIG. 1 sets forth a network diagram illustrating an exemplary system recasting a legacy web page as a motion picture with audio according to embodiments of the present invention.

Exemplary methods, apparatus, and products for recasting a legacy web page as a motion picture with audio and recasting search engine results as a motion picture with audio are described with reference to the accompanying drawings, beginning with FIG. 1. FIG. 1 sets forth a network diagram illustrating an exemplary system for recasting a legacy web page as a motion picture with audio according to embodiments of the present invention. A legacy web page is a web page typically implemented as a markup document designed to be displayed in a conventional browser. Recasting a legacy web page as a motion picture with audio according to embodiments of the present invention provides a user with an enhanced dynamic view of the content of the legacy web page.

Recasting a legacy web page as a motion picture with audio and recasting search engine results as a motion picture with audio in this example may be carried out by one of a plurality of client devices (107, 112, 110, and 118) or by a proxy motion picture recasting server (151). The client devices (107, 112, 110, and 118) and the proxy motion picture recasting server (151) of the system of FIG. 1 operate generally to carry out recasting a legacy web page as a motion picture with audio by retrieving a legacy web page (404); identifying audio objects in the legacy web page (404) for audio rendering; identifying video objects in the legacy web page for motion picture rendering; associating one or more of the video objects for motion picture rendering with one or more of the audio objects for audio rendering; determining in dependence upon the selected audio objects and video objects a duration for the motion picture; selecting audio events for rendering the audio objects identified for audio rendering; selecting motion picture video events for rendering the video objects identified for motion picture rendering; assigning the selected audio events and the selected video events to playback times for the motion picture; rendering, with the selected audio events at their assigned playback times, the audio content of the each of the audio objects identified for audio rendering; rendering, with the selected motion picture video events at their assigned playback times, the video content of the video objects identified for motion picture rendering; and recording in a multimedia file the rendered audio content and motion picture video content.

The client devices (107, 112, 110, and 118) and the proxy motion picture recasting server (151) of the system of FIG. 1 operate generally to carry out recasting search engine results as a motion picture with audio by identifying a search engine query; providing to a search engine the query; receiving from the search engine the results of the query; retrieving a plurality of legacy web pages in dependence upon the results; identifying audio objects in the plurality of legacy web pages for audio rendering; identifying video objects in the plurality of legacy web pages for motion picture rendering; associating one or more of the video objects for motion picture rendering with one or more of the audio objects for audio rendering; determining in dependence upon the selected audio objects and video objects a duration for the motion picture; selecting audio events for rendering the audio objects identified for audio rendering; selecting motion picture video events for rendering the video objects identified for motion picture rendering; assigning the selected audio events and the selected motion picture video events to playback times for the motion picture; rendering, with the selected audio events at their assigned playback times, the audio content of the each of the audio objects identified for audio rendering; rendering, with the selected motion picture video events at their assigned playback times, the video content of the video objects identified for motion picture rendering; and recording in a multimedia file the rendered audio content and motion picture video content.

The system of FIG. 1 includes a plurality of web servers (147) connected for data communications through a wireline connection (123) to network (100). The web servers (147) may be any servers that provide to client devices legacy web pages, typically implemented as markup documents, that may be recast according to embodiments of the present invention. The web servers (147) typically provide such web pages via data communications protocol, HTTP, HDTP, WAP, or the like. That is, although the term 'web' is used to describe the web servers generally in this specification, there is no limitation of data communications between client devices and proxy motion picture recasting servers and the web servers to HTTP alone. The web pages also may be implemented in any markup language as will occur to those of skill in the art.

The system of FIG. 1 includes example client devices:
personal computer (107) which is coupled for data communications to data communications network (100) through a wireline connection (120) and also coupled for data communications such as synchronization with a portable media player (136), examples of portable media players include the iPod® from Apple and Creative Zen Vision from Creative labs,
personal digital assistant ('PDA') (112) which is coupled for data communications to data communications network (100) through wireless connection (114),
mobile telephone (110) which is coupled for data communications to data communications network (100) through a wireless connection (116), and
laptop computer (126) which is coupled for data communications to data communications network (100) through a wireless connection (118).

Each of the example client devices in the system of FIG. 1 includes a web browser for displaying legacy web pages (406) as they are served up by a web server (147) coupled for data communications to data communications network (100) through wireline connection (123). Each of the example client devices in the system of FIG. 1 also includes a motion picture recasting engine (180), computer program instructions capable of retrieving a legacy web page; identifying audio objects in the legacy web page for audio rendering; identifying video objects in the legacy web page for motion picture rendering; associating one or more of the video objects for motion picture rendering with one or more of the audio objects for audio rendering; determining in dependence upon the selected audio objects and video objects a duration for the motion picture; selecting audio events for rendering the audio objects identified for audio rendering; selecting motion picture video events for rendering the video objects identified for motion picture rendering; assigning the selected audio events and the selected video events to playback times for the motion picture; rendering, with the selected audio events at their assigned playback times, the audio content of the each of the audio objects identified for audio rendering; rendering, with the selected motion picture video events at their assigned playback times, the video content of the video objects identified for motion picture rendering; and recording in a multimedia file the rendered audio content and motion picture video content.

Each of the example client devices in the system of FIG. 1 also includes a motion picture search engine (198), computer program instructions for recasting search engine results as a motion picture with audio including computer program instructions capable of identifying a search engine query; providing to a search engine the query; receiving from the search engine the results of the query; retrieving a plurality of legacy web pages in dependence upon the results; identifying audio objects in the plurality of legacy web pages for audio rendering; identifying video objects in the plurality of legacy web pages for motion picture rendering; associating one or more of the video objects for motion picture rendering with one or more of the audio objects for audio rendering; determining in dependence upon the selected audio objects and video objects a duration for the motion picture; selecting audio events for rendering the audio objects identified for audio rendering; selecting motion picture video events for rendering the video objects identified for motion picture rendering; assigning the selected audio events and the selected motion picture video events to playback times for the motion picture; rendering, with the selected audio events at their assigned playback times, the audio content of the each of the audio objects identified for audio rendering; rendering, with the selected motion picture video events at their assigned playback times, the video content of the video objects identified for motion picture rendering; and recording in a multimedia file the rendered audio content and motion picture video content.

Each of the example client devices in the system of FIG. 1 also includes a digital media player application (196) capable of playback of the multimedia file encoding the motion picture recasting the legacy web page. Examples of digital media player applications include Music Match™, iTunes®, Songbird™, and others as will occur to those of skill in the art.

The web browser (190), the digital media player application (196) and the motion picture recasting engine (180) is shown in connection with only the personal computer (107) for clarity of explanation only. In fact, in the example of FIG. 1 each client device has installed upon it a web browser, digital media player application, and motion picture recasting engine according to embodiments of the present invention The system of FIG. 1 also includes a proxy motion picture recasting server (151) including a proxy motion picture recasting engine (188), computer program instructions capable of retrieving a legacy web page; identifying audio objects in the legacy web page for audio rendering; identifying video objects in the legacy web page for motion picture rendering; associating one or more of the video objects for motion picture rendering with one or more of the audio objects for audio rendering; determining in dependence upon the selected audio objects and video objects a duration for the motion picture; selecting audio events for rendering the audio objects identified for audio rendering; selecting motion picture video events for rendering the video objects identified for motion picture rendering; assigning the selected audio events and the selected video events to playback times for the motion picture; rendering, with the selected audio events at their assigned playback times, the audio content of the each of the audio objects identified for audio rendering; rendering, with the selected motion picture video events at their assigned playback times, the video content of the video objects identified for motion picture rendering; and recording in a multimedia file the rendered audio content and motion picture video content. A multimedia file recasting a web page as a motion picture with audio created by the proxy motion picture recasting engine (188) on a proxy motion picture recasting server (151) may be downloaded to one or more of the client devices (120, 114, 116, and 118) and played back using the digital media player application (196) installed on each client device.

The proxy motion picture recasting server (151) also includes a proxy motion picture search engine (194), computer program instructions for recasting search engine results as a motion picture with audio including computer program instructions capable of identifying a search engine query; providing to a search engine the query; receiving from the search engine the results of the query; retrieving a plurality of legacy web pages in dependence upon the results; identifying audio objects in the plurality of legacy web pages for audio rendering; identifying video objects in the plurality of legacy web pages for motion picture rendering; associating one or more of the video objects for motion picture rendering with one or more of the audio objects for audio rendering; determining in dependence upon the selected audio objects and video objects a duration for the motion picture; selecting audio events for rendering the audio objects identified for audio rendering; selecting motion picture video events for rendering the video objects identified for motion picture rendering; assigning the selected audio events and the selected motion picture video events to playback times for the motion picture; rendering, with the selected audio events at their assigned playback times, the audio content of the each of the audio objects identified for audio rendering; rendering, with the selected motion picture video events at their assigned playback times, the video content of the video objects identified for motion picture rendering; and recording in a multimedia file the rendered audio content and motion picture video content. A multimedia file recasting search engine results as a motion picture with audio created by the proxy motion picture search engine (194) on a proxy motion picture recasting server (151) may be downloaded to one or more of the client devices (120, 114, 116, and 118) and played back using the digital media player application (196) installed on each client device.

As mentioned above, recasting a legacy web page as a motion picture with audio and recasting search engine results as a motion picture with audio according to the example of FIG. 1 may be carried on one or more client devices or on a proxy motion picture recasting server. A client device that itself contains its own motion picture recasting engine or motion picture search engine is said to implement a 'thick client', because the thick client device itself contains all the functionality needed to carry out recasting a legacy web page as a motion picture with audio or recasting search engine results as a motion picture with audio according to the present invention. A device that does not contain its own motion picture recasting engine or motion picture search engine is said to implement a 'thin client' because the thin client itself contains only a relatively thin layer of application software that obtains a multimedia file recasting the web page as a motion picture with audio by download that was created by a proxy motion picture recasting engine on a proxy motion picture recasting server.

The system of FIG. 1 includes a data communications network (100) that connects the devices and servers for data communications. A data communications network useful for recasting a legacy web page as a motion picture with audio and recasting search engine results as a motion picture with audio according to embodiments of the present invention is a data communications network composed of a plurality of computers that function as data communications routers connected for data communications with packet switching protocols. Such a data communications network may be implemented with optical connections, wireline connections, or with wireless connections. Such a data communications network may include intranets, internets, local area data communications networks ('LANs'), and wide area data communications networks ('WANs'). Such a data communications network may implement, for example:

a link layer with the Ethernet Protocol or the Wireless Ethernet Protocol, a data communications network layer with the Internet Protocol ('IP'), a transport layer with the Transmission Control Protocol ('TCP') or the User Datagram Protocol ('UDP'), an application layer with the HyperText Transfer Protocol ('HTTP'), the Session Initiation Protocol ('SIP'), the Real Time Protocol ('RTP'), the Distributed Multimodal Synchronization Protocol ('DMSP'), the Wireless Access Protocol ('WAP'), the Handheld Device Transfer Protocol ('HDTP'), the ITU protocol known as H.323, and other protocols as will occur to those of skill in the art.

The arrangement of the client devices (107, 112, 110, and 126), web server (147), proxy motion picture recasting server (151), and the data communications network (100) making up the exemplary system illustrated in FIG. 1 are for explanation, not for limitation. Data processing systems useful for recasting a legacy web page as a motion picture with audio and recasting search engine results as a motion picture with audio according to various embodiments of the present invention may include additional servers, routers, other devices, and peer-to-peer architectures, not shown in FIG. 1, as will occur to those of skill in the art. Data communications networks in such data processing systems may support many data communications protocols in addition to those noted above. Various embodiments of the present invention may be implemented on a variety of hardware platforms in addition to those illustrated in FIG. 1.

Recasting a legacy web page as a motion picture with audio and recasting search engine results as a motion picture with audio according to embodiments of the present invention in a thin client architecture may be implemented with one or more proxy motion picture recasting servers. For further explanation, therefore, FIG. 2 sets forth a block diagram of automated computing machinery comprising an example of a computer useful as a proxy motion picture recasting server (151) for recasting a legacy web page as a motion picture with audio and recasting search engine results as a motion picture with audio according to embodiments of the present invention. The proxy motion picture recasting server (151) of FIG. 2 includes at least one computer processor (156) or 'CPU' as well as random access memory (168) ('RAM') which is connected through a high speed memory bus (166) and bus adapter (158) to processor (156) and to other components of the proxy motion picture recasting server.

Stored in RAM (168) is a motion picture recasting engine (188), a module of computer program instructions capable of recasting a legacy web page as a motion picture with audio. The motion picture recasting engine includes computer program instructions capable of retrieving a legacy web page; identifying audio objects in the legacy web page for audio rendering; identifying video objects in the legacy web page for motion picture rendering; associating one or more of the video objects for motion picture rendering with one or more of the audio objects for audio rendering; determining in dependence upon the selected audio objects and video objects a duration for the motion picture; selecting audio events for rendering the audio objects identified for audio rendering; selecting motion picture video events for rendering the video objects identified for motion picture rendering; assigning the selected audio events and the selected video events to playback times for the motion picture; rendering, with the selected audio events at their assigned playback times, the audio content of the each of the audio objects identified for audio rendering; rendering, with the selected motion picture video events at their assigned playback times, the video content of the video objects identified for motion picture rendering; and recording in a multimedia file the rendered audio content and motion picture video content.

Figure 2:
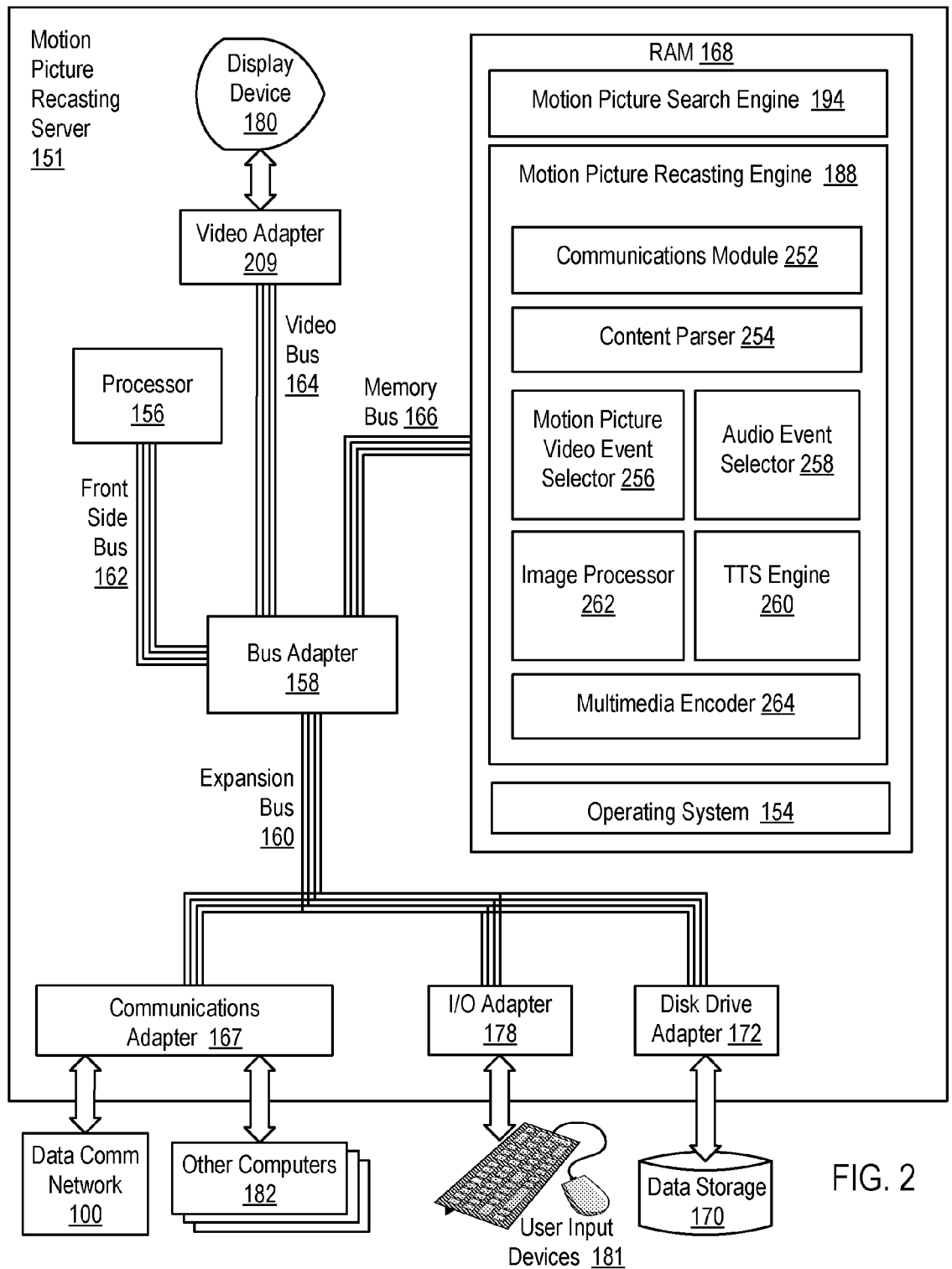
FIG. 2 sets forth a block diagram of automated computing machinery comprising an example of a computer useful as a proxy motion picture recasting server for recasting a legacy web page as a motion picture with audio according to embodiments of the present invention.

The exemplary motion picture recasting engine (188) of FIG. 2 includes a number of software modules useful in carrying out some of the specific steps of recasting a legacy web page as a motion picture with audio. The motion picture recasting engine (188) of FIG. 2 includes a communications module (252), computer program instructions capable of retrieving a legacy web page from a web server. Communications modules useful in motion picture recasting engines according to embodiments of the present invention may be capable of retrieving legacy web pages via data communications protocol, HTTP, HDTP, WAP, and others as will occur to those of skill in the art.

The motion picture recasting engine (188) of FIG. 2 includes a content parser (254) computer program instructions capable of identifying audio objects in the legacy web page for audio rendering and identifying video objects in the legacy web page for motion picture rendering. Audio objects are objects typically identified in dependence upon markup in the legacy web page the content of which is to be rendered as audio in the motion picture recast of the legacy web page. Video objects are objects also typically identified in dependence upon markup in the legacy web page the content of which is to be rendered as video, often motion picture video, in the motion picture recast of the legacy web page.

The motion picture recasting engine (188) of FIG. 2 includes a motion picture video event selector (256), computer program instructions for selecting motion picture video events for rendering the video objects identified for motion picture rendering. A motion picture video event is a pre-coded video software function that when executed creates motion picture from typically static content. Such a motion picture video event typically takes as parameters one or more images and one or more metrics defining how the images is to be rendered. Examples of motion picture video events include functions for panning an image left, panning an image right, zooming in on an image, fading in and out from one image to another, moving images up and down, and so on. Such motion picture video events create motion picture by repeatedly copying the image with slight modifications with each copy such that when the series of images are played back the image has the appearance of motion picture. To aid in the copying and modification of those images, the motion picture recasting engine (190) of FIG. 2 includes an image processor (262), capable of copying and modifying images.

For further explanation, consider for example the motion picture video event 'panLeft(image, seconds, speed).' panLeft( ) is a software function that takes as parameters an image, the duration of the event, and a parameter defining the speed of the event. panLeft( ) repeatedly copies the image with a slight modification of the image with each copy such that when the series of images are played back as motion picture the image pans to the left. The number of copies made by panLeft( ) is defined by the duration of the video event and the degree of modification to each image to effect the visual image of the image of panning left is defined by the speed parameter.

The motion picture recasting engine (188) of FIG. 2 includes an audio event selector (256), computer program instructions for selecting audio events for rendering the audio objects identified for audio rendering. An audio event is a software function that produces audio for the motion picture recast of the legacy web page. Audio events may include functions that create synthesized speech from display text of the web page, functions that play selected background music, functions that create enhanced sounds such as horns, beeps, car crashes, and so on.

As mentioned above, some audio events when rendering audio content produce synthesized speech. The motion picture recasting engine (188) of FIG. 2 therefore includes a text-to-speech engine (260). Examples of engines capable of converting text to speech for recasting a legacy web page as a motion picture with audio include, for example, IBM's ViaVoice® Text-to-Speech, Acapela Multimedia TTS, AT&T Natural Voices™ Text-to-Speech Engine, and Python's pyTTS class.

The motion picture recasting engine (188) of FIG. 2 also includes a multimedia encoder (264), computer program instructions capable of recording in a multimedia file the audio content of audio objects identified in the legacy web page that is rendered with selected audio events at assigned playback times and recording in the multimedia file motion picture video content of video objects identified in the legacy web page that is rendered with the selected motion picture video events at assigned playback times. Examples of multimedia encoders (264) that may be modified for recasting a legacy web page as a motion picture with audio include an MPEG-4 encoder such as those available from Nero Digital, BlueSofts, dicas, and others as will occur to those of skill in the art. Multimedia files useful in recasting a legacy web page as a motion picture with audio include MPEG-4, Quicktime Movie, Audio Video Interleave ('AVI'), and many others as will occur to those of skill in the art.

Also stored in RAM (168) is a proxy motion picture search engine (194), computer program instructions for recasting search engine results as a motion picture with audio including computer program instructions capable of identifying a search engine query; providing to a search engine the query; receiving from the search engine the results of the query; retrieving a plurality of legacy web pages in dependence upon the results; identifying audio objects in the plurality of legacy web pages for audio rendering; identifying video objects in the plurality of legacy web pages for motion picture rendering; associating one or more of the video objects for motion picture rendering with one or more of the audio objects for audio rendering; determining in dependence upon the selected audio objects and video objects a duration for the motion picture; selecting audio events for rendering the audio objects identified for audio rendering; selecting motion picture video events for rendering the video objects identified for motion picture rendering; assigning the selected audio events and the selected motion picture video events to playback times for the motion picture; rendering, with the selected audio events at their assigned playback times, the audio content of the each of the audio objects identified for audio rendering; rendering, with the selected motion picture video events at their assigned playback times, the video content of the video objects identified for motion picture rendering; and recording in a multimedia file the rendered audio content and motion picture video content. A multimedia file recasting search engine results as a motion picture with audio created by the proxy motion picture search engine (194) on a proxy motion picture recasting server (151) may be downloaded to one or more of the client devices (120, 114, 116, and 118) and played back using the digital media player application (196) installed on each client device.

Also stored in RAM (168) is an operating system (154). Operating systems useful in proxy motion picture recasting servers according to embodiments of the present invention include UNIX™, Linux™, Microsoft NT™, AIX™, IBM's i5/OS™, and others as will occur to those of skill in the art. Operating system (154), motion picture recasting engine (188), and other components in the example of FIG. 2 are shown in RAM (168), but many components of such software typically are stored in non-volatile memory also, for example, on a disk drive (170).

Proxy motion picture recasting server (151) of FIG. 2 includes bus adapter (158), a computer hardware component that contains drive electronics for high speed buses, the front side bus (162), the video bus (164), and the memory bus (166), as well as drive electronics for the slower expansion bus (160). Examples of bus adapters useful in proxy motion picture recasting servers according to embodiments of the present invention include the Intel Northbridge, the Intel Memory Controller Hub, the Intel Southbridge, and the Intel I/O Controller Hub. Examples of expansion buses useful in proxy motion picture recasting servers according to embodiments of the present invention include Industry Standard Architecture ('ISA') buses and Peripheral Component Interconnect ('PCI') buses.

Proxy motion picture recasting server (151) of FIG. 2 includes disk drive adapter (172) coupled through expansion bus (160) and bus adapter (158) to processor (156) and other components of the proxy motion picture recasting server (151). Disk drive adapter (172) connects non-volatile data storage to the proxy motion picture recasting server (151) in the form of disk drive (170). Disk drive adapters useful in proxy motion picture recasting servers include Integrated Drive Electronics ('IDE') adapters, Small Computer System Interface ('SCSI') adapters, and others as will occur to those of skill in the art. In addition, non-volatile computer memory may be implemented for a proxy motion picture recasting server as an optical disk drive, electrically erasable programmable read-only memory (so-called 'EEPROM' or 'Flash' memory), RAM drives, and so on, as will occur to those of skill in the art.

The example proxy motion picture recasting server of FIG. 2 includes one or more input/output ('I/O') adapters (178). I/O adapters in proxy motion picture recasting servers implement user-oriented input/output through, for example, software drivers and computer hardware for controlling output to display devices such as computer display screens, as well as user input from user input devices (181) such as keyboards and mice. The example proxy motion picture recasting server of FIG. 2 includes a video adapter (209), which is an example of an I/O adapter specially designed for graphic output to a display device (188) such as a display screen or computer monitor. Video adapter (209) is connected to processor (156) through a high speed video bus (164), bus adapter (158), and the front side bus (162), which is also a high speed bus.

The exemplary proxy motion picture recasting server (151) of FIG. 2 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful according to embodiments of the present invention include modems for wired dial-up communications, Ethernet (IEEE 802.3) adapters for wired data communications network communications, and 802.11 adapters for wireless data communications network communications.

Figure 3:
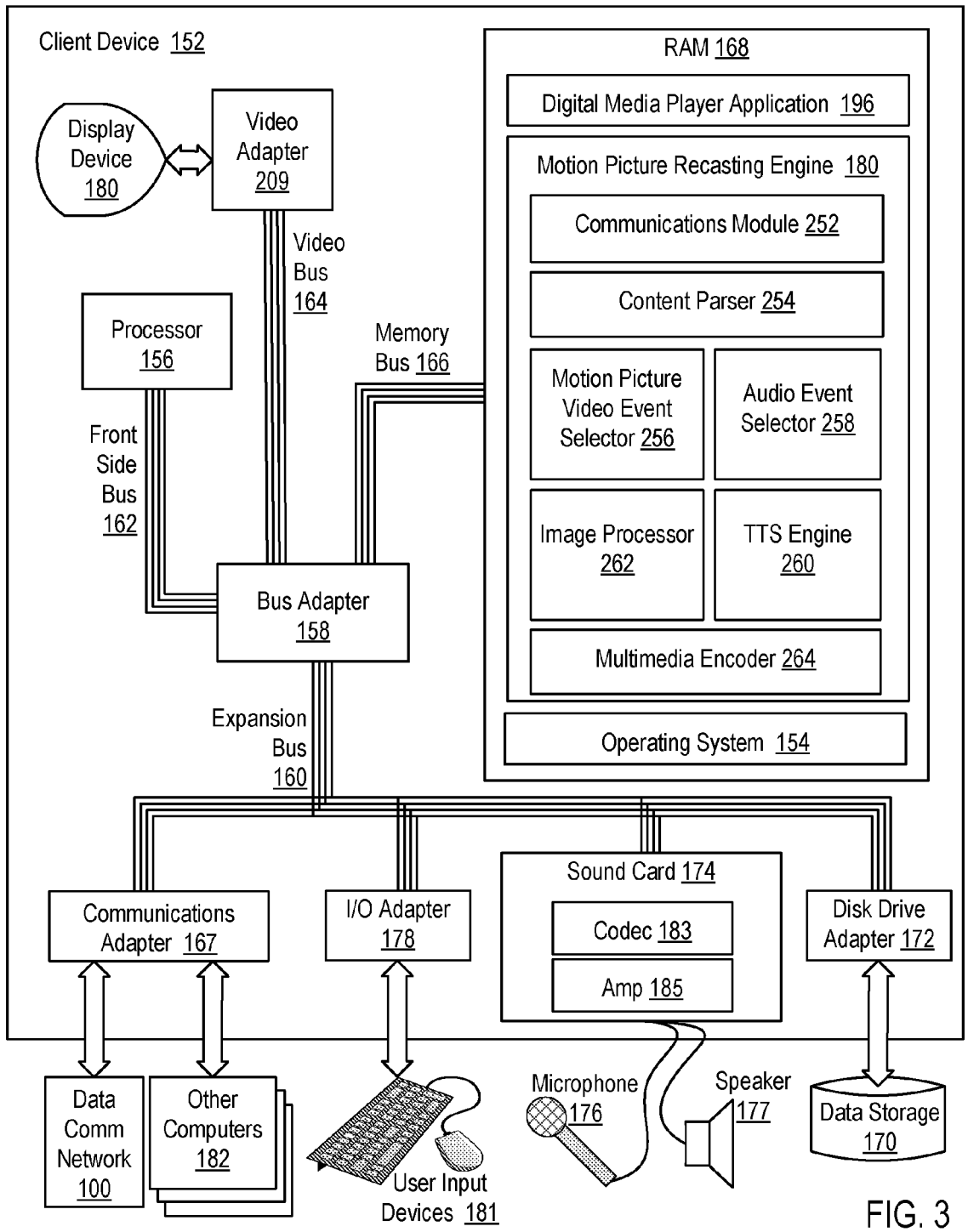
FIG. 3 sets forth a functional block diagram of exemplary apparatus for recasting a legacy web page as a motion picture with audio in a thick client architecture according to embodiments of the present invention.

For further explanation, FIG. 3 sets forth a functional block diagram of exemplary apparatus for recasting a legacy web page as a motion picture with audio in a thick client architecture according to embodiments of the present invention. Stored in RAM (168) is a motion picture recasting engine (180), a module of computer program instructions capable of recasting a legacy web page as a motion picture with audio. The motion picture recasting engine includes computer program instructions capable of retrieving a legacy web page; identifying audio objects in the legacy web page for audio rendering; identifying video objects in the legacy web page for motion picture rendering; associating one or more of the video objects for motion picture rendering with one or more of the audio objects for audio rendering; determining in dependence upon the selected audio objects and video objects a duration for the motion picture; selecting audio events for rendering the audio objects identified for audio rendering; selecting motion picture video events for rendering the video objects identified for motion picture rendering; assigning the selected audio events and the selected video events to playback times for the motion picture; rendering, with the selected audio events at their assigned playback times, the audio content of the each of the audio objects identified for audio rendering; rendering, with the selected motion picture video events at their assigned playback times, the video content of the video objects identified for motion picture rendering; and recording in a multimedia file the rendered audio content and motion picture video content. As with the exemplary motion picture recasting engine of FIG. 2, the motion picture recasting engine (180) of FIG. 3 includes a number of software modules (252, 254, 256, 258, 262, 260, and 264) useful in carrying out some of the specific steps of recasting a legacy web page as a motion picture with audio.

Also stored in RAM (168) is a motion picture search engine (198), computer program instructions for recasting search engine results as a motion picture with audio including computer program instructions capable of identifying a search engine query; providing to a search engine the query; receiving from the search engine the results of the query; retrieving a plurality of legacy web pages in dependence upon the results; identifying audio objects in the plurality of legacy web pages for audio rendering; identifying video objects in the plurality of legacy web pages for motion picture rendering; associating one or more of the video objects for motion picture rendering with one or more of the audio objects for audio rendering; determining in dependence upon the selected audio objects and video objects a duration for the motion picture; selecting audio events for rendering the audio objects identified for audio rendering; selecting motion picture video events for rendering the video objects identified for motion picture rendering; assigning the selected audio events and the selected motion picture video events to playback times for the motion picture; rendering, with the selected audio events at their assigned playback times, the audio content of the each of the audio objects identified for audio rendering; rendering, with the selected motion picture video events at their assigned playback times, the video content of the video objects identified for motion picture rendering; and recording in a multimedia file the rendered audio content and motion picture video content. A multimedia file recasting search engine results as a motion picture with audio created by the proxy motion picture search engine (194) on a proxy motion picture recasting server (151) may be downloaded to one or more of the client devices (120, 114, 116, and 118) and played back using the digital media player application (196) installed on each client device.

Also stored in RAM (168) is a digital media player application (196) capable of playback of the multimedia file encoding the motion picture recasting the legacy web page for the search results. Examples of digital media player applications include Music Match™, iTunes®, Songbird™, and others as will occur to those of skill in the art.

Client device (152) of FIG. 3, like the server of FIG. 2, includes a bus adapter (158), a front side bus (162), a video bus (164), a memory bus (166), drive electronics for a slower expansion bus (160), a disk drive adapter (172), a processor (156), non-volatile data storage in the form of disk drive (170), one or more input/output ('I/O') adapters (178), user input devices (181), a video adapter (209), display device (180), a communications adapter (167) and so on. The exemplary client device (152) of FIG. 3 also includes a sound card (174) including an amplifier (185) for producing the audio portion of the playback of the multimedia file containing the recast of the legacy web page.

Recasting a Legacy Web Page as a Motion Picture with Audio

Figure 4:
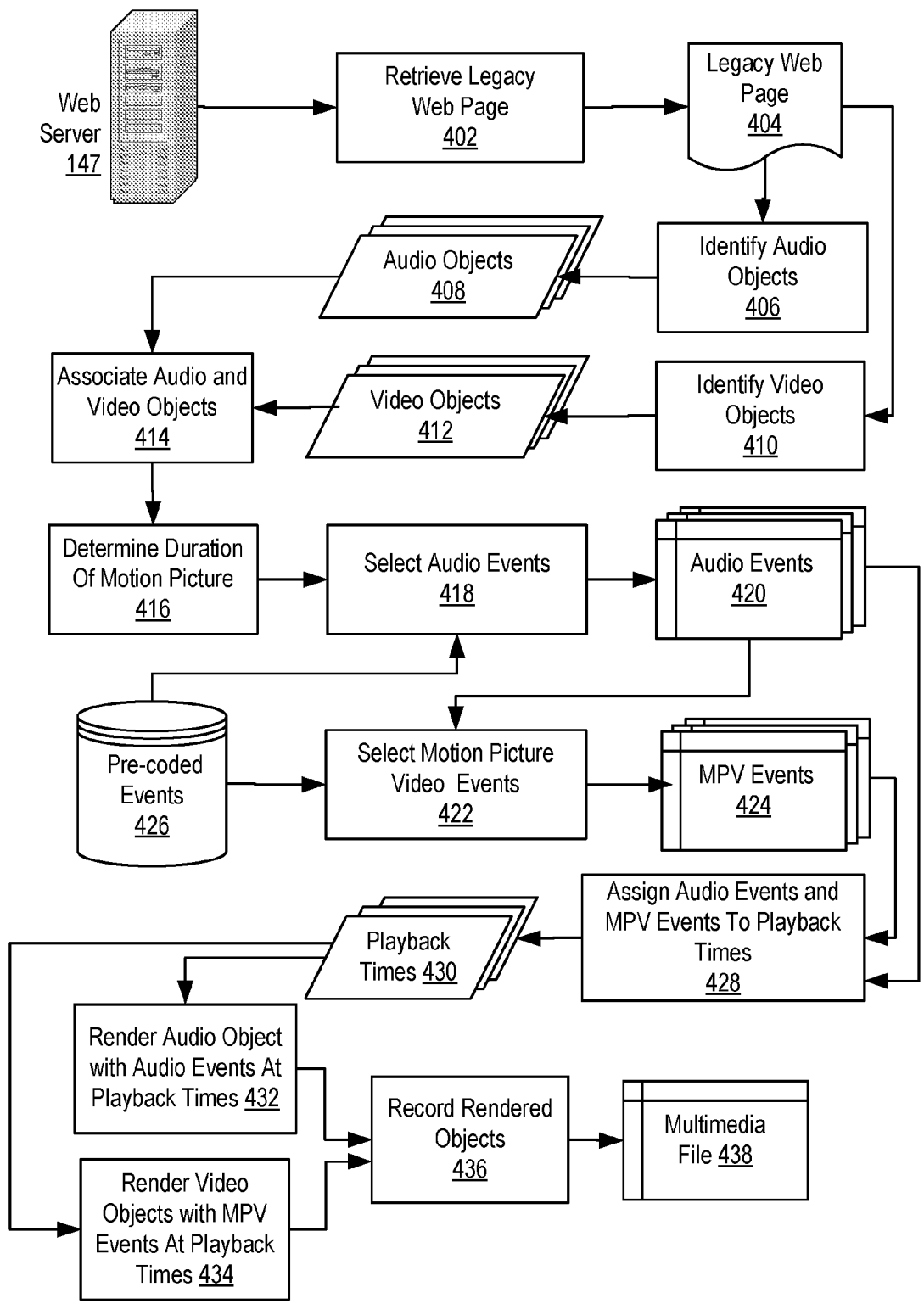
FIG. 4 sets forth a flow chart illustrating an exemplary computer-implemented method for recasting a legacy web page as a motion picture with audio.

For further explanation, FIG. 4 sets forth a computer-implemented method for recasting a legacy web page as a motion picture with audio according to the present invention. As mentioned above, legacy web page is a web page typically implemented as a markup document designed to be displayed in a conventional browser. Recasting a legacy web page as a motion picture with audio according to the method of FIG. 4 provides a user with an enhanced dynamic view of the content of the legacy web page.

The method of FIG. 4 includes retrieving (402) a legacy web page (404) and identifying (406) audio objects (408) in the legacy web page (404) for audio rendering. As mentioned above, audio objects are objects typically identified in dependence upon markup in the legacy web page the content of which is to be rendered as audio in the motion picture recast of the legacy web page. One example of an audio object useful in recasting legacy web pages according to the present invention includes display text. Display text is text that is displayed when the legacy web page is displayed in a conventional browser. Such display text may be identified as an audio object and the text may be converted to synthesized speech and played as audio in the motion picture recast of the legacy web page. Another example of audio objects includes audio files contained in the legacy web page. Such audio files may be extracted and included as audio in the motion picture recast of the legacy web page.

As mentioned above, identifying (406) audio objects (408) in the legacy web page (404) for audio rendering may be carried out in dependence upon markup in the legacy web page. Such markup may include tags identifying audio files, display text, and other objects. Markup may also provide some context to the display text by identifying the text as a heading, a paragraph, and so on. Identifying (406) audio objects (408) in the legacy web page (404) for audio rendering may therefore be carried out by parsing the markup of the legacy web page and identifying objects in the legacy web page as audio objects in dependence upon the markup of the legacy web page and audio object identification rules. Audio object identification rules are rules designed to identify as audio objects particular display text in the legacy web page for audio rendering in the motion picture recast of the legacy web page such as headings, paragraphs, tag lines, and so on.

The method of FIG. 4 also includes identifying (410) video objects (412) in the legacy web page (404) for motion picture rendering. As mentioned above, video objects are objects also typically identified in dependence upon markup in the legacy web page the content of which is to be rendered as video, often motion picture video, in the motion picture recast of the legacy web page. Examples of video objects include images and display text that may be rendered with video events to effect motion picture in the recast of the legacy web page.

Identifying (410) video objects (412) in the legacy web page (404) for motion picture rendering may be carried out in dependence upon markup in the legacy web page. Such markup may include tags identifying image files, display text, and other objects that may be rendered with video events to effect motion picture. Markup may also provide some context to the display text by identifying the text as a heading, a paragraph, and so on. Identifying (410) video objects (412) in the legacy web page (404) for motion picture rendering may therefore be carried out by parsing the markup of the legacy web page and identifying objects in the legacy web page as video objects in dependence upon the markup of the legacy web page and video object identification rules. Video object identification rules are rules designed to identify as video objects particular images, display text, and other content in the legacy web page for motion picture video rendering in the motion picture recast of the legacy web page.

The method of FIG. 4 also includes associating (414) one or more of the video objects (412) for motion picture rendering with one or more of the audio objects (408) for audio rendering. Associating (414) one or more of the video objects (412) for motion picture rendering with one or more of the audio objects (408) for audio rendering links the content of the one or more video objects with content of the one or more audio objects. The content is linked because the content of video objects is rendered motion as picture in close proximity in playback time as the associated audio content is rendered. In this manner, the audio rendered content supports the motion picture video content to create a motion picture recast of the those objects of the legacy web page.

Often legacy web pages are designed to display text and images relating to the subject matter of that text which is displayed in close proximity. Associating one or more of the objects for motion picture rendering with one or more of the objects for audio rendering according to the method of FIG. 4 may be therefore carried out by determining layout locations of the identified objects in the legacy web page identified for audio rendering; determining layout locations of identified objects in the legacy web page identified for motion picture video rendering; and associating one or more objects for motion picture video rendering with objects for audio rendering in dependence upon their layout locations. A layout location is the display location of an object when displayed in a conventional browser. That is, the layout location is not the physical location of the audio object or video object in the legacy web page itself but rather the location on a display of those objects when the legacy web page is displayed in the conventional browser. As such, determining layout locations of the identified objects in the legacy web page identified for audio rendering and determining layout locations of identified objects in the legacy web page identified for motion picture video rendering may be carried out by creating in memory a representation of the display of the objects of the legacy web page and associating one or more objects for motion picture video rendering with objects for audio rendering in dependence upon their layout locations may be carried out by associating objects of the legacy web page that have layout locations that are close to one another.

The duration of a motion picture recast of a legacy web page is often a function of the quantity of content to be included in the motion picture recast. The method of FIG. 4 therefore also includes determining (416) in dependence upon the selected audio objects (408) and video objects (412) a duration for the motion picture. Determining (416) in dependence upon the selected audio objects (408) and video objects (412) a duration for the motion picture may be carried out by determining the duration of the motion picture in dependence upon the quantity of content of the identified objects identified for audio rendering and the quantity of content of the identified objects identified for motion picture rendering. The duration of the motion picture may therefore be determined as a function of the number of words of display text to be audio rendered, the speech pace of synthesized speech created from that display text, the length of audio clips in the legacy web page, the number of images to be rendered as motion picture and others.

The method of FIG. 4 also includes selecting (418) audio events (420) for rendering the audio objects (408) identified for audio rendering. As mentioned above, an audio event is a software function that produces audio for the motion picture recast of the legacy web page. Audio events may include functions that create synthesized speech from display text of the web page, functions that play selected background music, functions that create enhanced sounds such as horns, beeps, car crashes, and so on.

The method of FIG. 4 also includes selecting (422) motion picture video events (424) for rendering the video objects (412) identified for motion picture rendering.

A motion picture video event is a pre-coded video software function that when executed creates motion picture from typically static content. Such a motion picture video event typically takes as parameters one or more images and one or more metrics defining how the images is to be rendered. Examples of motion picture video events include functions for panning an image left, panning an image right, zooming in on an image, fading in and out from one image to another, moving images up and down, and so on. Such motion picture video events create motion picture my repeatedly copying the image with slight modifications with each copy such that when the series of images are played back the image has the appearance of motion picture. To aid in the copying and modification of those images, the motion picture recasting engine (190) of FIG. 2 includes an image processor (262), capable of copying and modifying images.

For further explanation, consider for example the motion picture video event 'panLeft(image, seconds, speed).' panLeft( ) is a software function that takes as parameters an image, the duration of the event, and a parameter defining the speed of the event. panLeft( ) repeatedly copies the image with a slight modification of the image with each copy such that when the series of images are played back as motion picture the image pans to the left. The number of copies made by panLeft( ) is defined by the duration of the video event and the degree of modification to each image to effect the visual image of the image of panning left is defined by the speed parameter.

The method of FIG. 4 also includes assigning (428) the selected audio events (408) and the selected motion picture video events (412) to playback times (430) for the motion picture. Assigning (428) the selected audio events (408) and the selected video events (412) to playback times (430) for the motion picture may be carried out by determining the order and duration of each collection of associated audio and motion picture video events and assigning the first collection of associated events to playback time 00:00:00 and assigning each successive collection of associated events to a playback time equal to the start of the previous associated collection of events plus the playback duration of those previous associated events.

The method of FIG. 4 also includes rendering (432), with the selected audio events (420) at their assigned playback times (430), the audio content of each of the audio objects (408) identified for audio rendering. Rendering (432), with the selected audio events (420) at their assigned playback times (430), the audio content of the each of the audio objects (408) identified for audio rendering may be carried out by executing the audio events such that the rendered content of the audio objects may be recorded as audio in a multimedia file such that that audio content may be played back from the media file.

The method of FIG. 4 also includes rendering (434), with the selected motion picture video events (424) at their assigned playback times (430), the video content of the video objects (412) identified for motion picture rendering. Rendering (434), with the selected motion picture video events (424) at their assigned playback times (430), the video content of the video objects (412) identified for motion picture rendering may be carried out by executing the motion picture video events such that the rendered content of the video objects may be recorded as video in a multimedia file such that that video content may be played back from the media file as motion picture.

The method of FIG. 4 also includes recording (436) in a multimedia file (438) the rendered audio content and motion picture video content. Recording (436) in a multimedia file (438) the rendered audio content and motion picture video content may be carried out with a multimedia encoder. Examples of multimedia encoders that may be modified for recasting a legacy web page as a motion picture with audio include an MPEG-4 encoder such as those available from Nero Digital, BlueSofts, dicas, and others as will occur to those of skill in the art. Multimedia files useful in recasting a legacy web page as a motion picture with audio include MPEG-4, Quicktime Movie, Audio Video Interleave ('AVI'), and many others as will occur to those of skill in the art.

As mentioned above, recasting a legacy web page as a motion picture with audio according to the method of FIG. 4 may be carried out in both thin client and thick client contents. In the thick client context, the method of FIG. 4 may be carried out on the device upon which the multimedia file recasting the legacy web page is played back. In the thin client context, the method of FIG. 4 is carried out on a proxy motion picture server and made available for download by providing at a network address the multimedia file for download.

As mentioned above, motion picture video events when executed often repeatedly render an image to effect motion picture. For further explanation, FIG. 5 sets forth a flow chart illustrating another exemplary method for recasting a legacy web page as a motion picture with audio that includes repeatedly rendering an image to effect motion picture. The method of FIG. 5 is similar to the method of FIG. 4 in that the method of FIG. 5 includes retrieving (402) a legacy web page (404); identifying (406) audio objects (408) in the legacy web page (404) for audio rendering; identifying (410) video objects (412) in the legacy web page (404) for motion picture rendering; associating (414) one or more of the video objects (412) for motion picture rendering with one or more of the audio objects (408) for audio rendering; determining (416) in dependence upon the selected audio objects (408) and video objects (412) a duration for the motion picture; selecting (418) audio events (420) for rendering the audio objects (408) identified for audio rendering; selecting (422) motion picture video events (424) for rendering the video objects (412) identified for motion picture rendering; assigning (428) the selected audio events (408) and the selected video events (412) to playback times (430) for the motion picture; rendering (432), with the selected audio events (420) at their assigned playback times (430), the audio content of the each of the audio objects (408) identified for audio rendering; rendering (434), with the selected motion picture video events (424) at their assigned playback times (430), the video content of the video objects (412) identified for motion picture rendering; and recording (436) in a multimedia file (438) the rendered audio content and motion picture video content.

Figure 5:
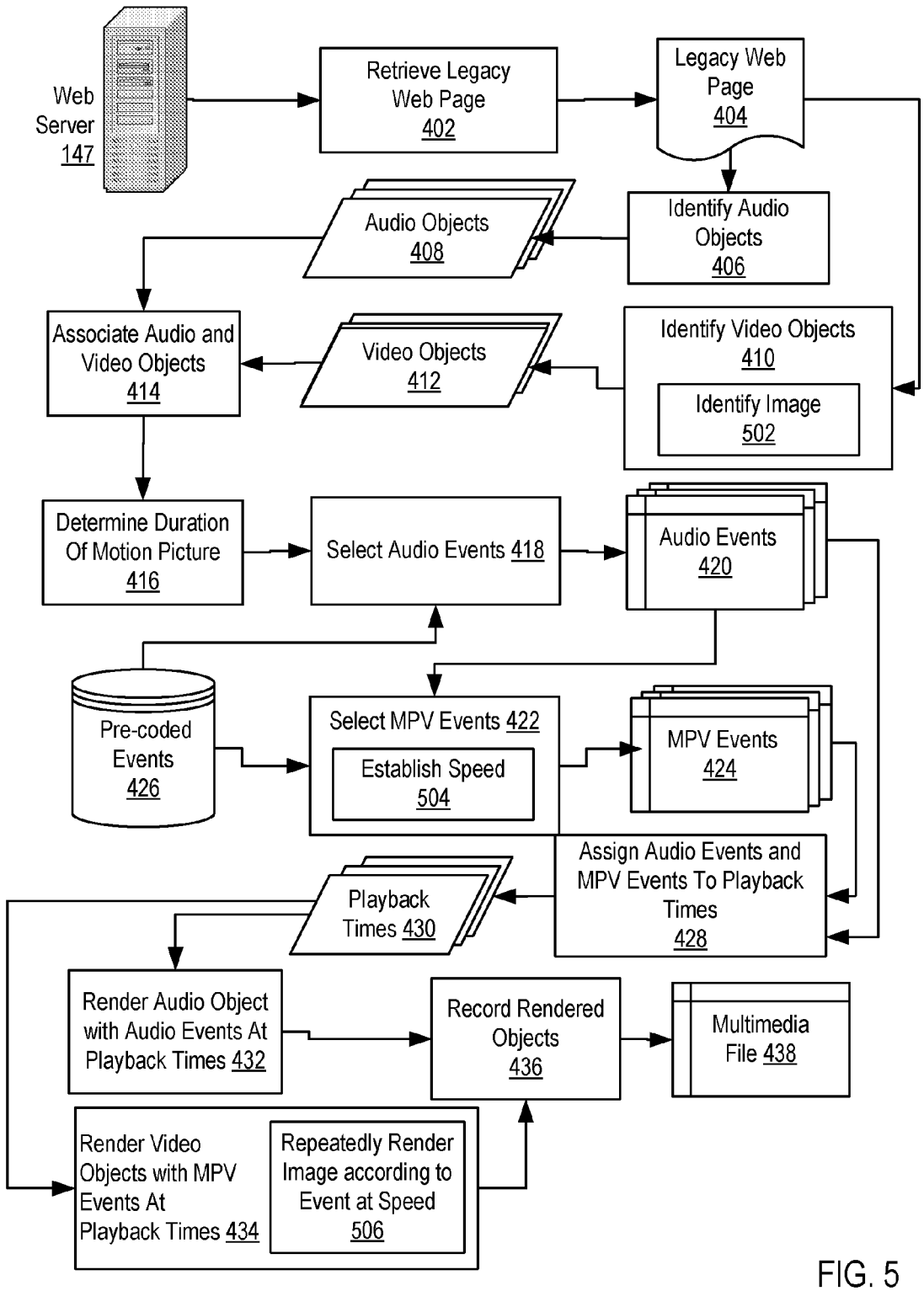
FIG. 5 sets forth a flow chart illustrating another exemplary method for recasting a legacy web page as a motion picture with audio.

The method of FIG. 5 differs from the method of FIG. 4 in that in the method of FIG. 5, identifying (410) video objects (412) in the legacy web page (404) for motion picture rendering includes identifying (502) images identified in the legacy web page (404); selecting (422) motion picture video events (424) for rendering the objects identified for motion picture rendering includes establishing (504) the speed of motion picture events; and rendering (434), with the selected motion picture video events (424) at their assigned playback times (430), the video content of the video objects (412) identified for motion picture rendering includes repeatedly rendering (506) the selected image according to the motion picture video event (464) and the established speed.

Turning to the method of FIG. 5 in more detail, in the method of FIG. 5, identifying (410) video objects (412) in the legacy web page (404) for motion picture rendering includes identifying (502) images identified in the legacy web page (404). Identifying (502) images identified in the legacy web page (404) may be carried out in dependence upon specific markup tags in the legacy web page specifying an image.

In the method of FIG. 5, selecting (422) motion picture video events (424) for rendering the objects identified for motion picture rendering includes establishing (504) the speed of motion picture events. Establishing (504) the speed of motion picture events is carried out by determining the duration of the motion picture video event and determining the degree of motion of the image created when executing that event. The speed of the motion picture video event may then be set such that the motion picture effected by executing the event adequately accomplishes the full range of motion of the event and in the duration of the event.

The method of FIG. 5 also includes rendering (434), with the selected motion picture video events (424) at their assigned playback times (430), the video content of the video objects (412) identified for motion picture rendering and also includes repeatedly rendering (506) the selected image according to the motion picture video event (464) and the established speed. Repeatedly rendering (506) the selected image according to the motion picture video event (464) and the established speed includes rendering the image with slight modifications with rendering such that the series of images has the appearance of motion picture.

As mentioned above, audio objects may include display text to be rendered as synthesized speech in the motion picture recast of the legacy web page. For further explanation, therefore, FIG. 6 sets forth another exemplary computer-implemented method for recasting a legacy web page as a motion picture with audio according to the present invention that includes converting display text to synthesized speech. The method of FIG. 6 is similar to the method of FIG. 4 in that the method of FIG. 6 includes retrieving (402) a legacy web page (404); identifying (406) audio objects (408) in the legacy web page (404) for audio rendering; identifying (410) video objects (412) in the legacy web page (404) for motion picture rendering; associating (414) one or more of the video objects (412) for motion picture rendering with one or more of the audio objects (408) for audio rendering; determining (416) in dependence upon the selected audio objects (408) and video objects (412) a duration for the motion picture; selecting (418) audio events (420) for rendering the audio objects (408) identified for audio rendering; selecting (422) motion picture video events (424) for rendering the video objects (412) identified for motion picture rendering; assigning (428) the selected audio events (408) and the selected video events (412) to playback times (430) for the motion picture; rendering (432), with the selected audio events (420) at their assigned playback times (430), the audio content of the each of the audio objects (408) identified for audio rendering; rendering (434), with the selected motion picture video events (424) at their assigned playback times (430), the video content of the video objects (412) identified for motion picture rendering; and recording (436) in a multimedia file (438) the rendered audio content and motion picture video content.

Figure 6:
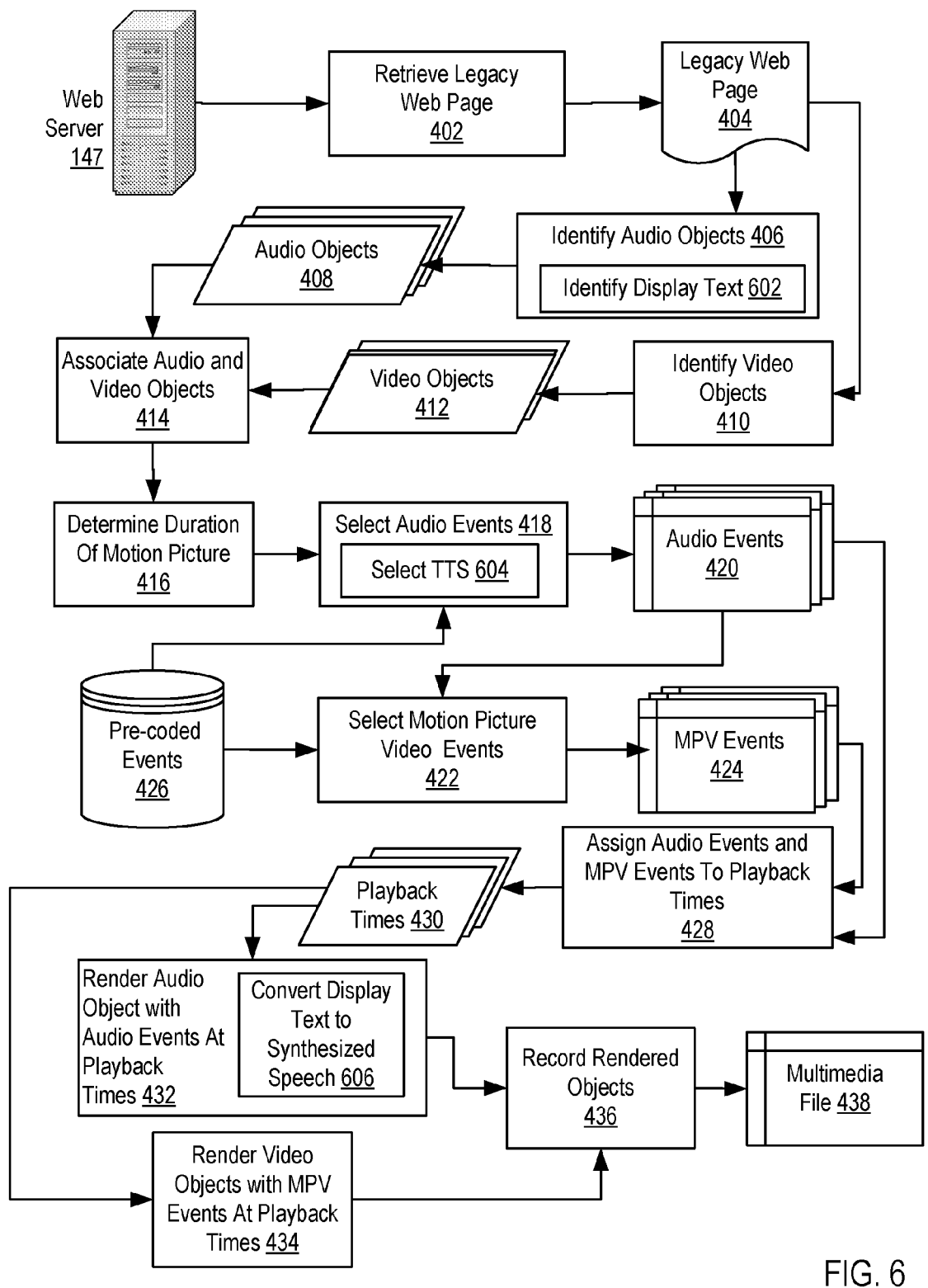
FIG. 6 sets forth a flow chart illustrating another exemplary method for recasting a legacy web page as a motion picture with audio.

The method of FIG. 6 differs from the method of FIG. 4 in that in the method of FIG. 6, identifying (406) audio objects (408) in the legacy web page (408) for audio rendering includes identifying (602) display text for text to speech conversion; selecting (418) audio events (420) for rendering the audio objects identified for audio rendering includes selecting (604) a text to speech event; and rendering (434), with the selected audio events (420) at their assigned playback times (430), the audio content of the each of the audio objects (408) identified for audio rendering includes converting (606) the display text to synthesized speech.

Turning to the method of FIG. 6 in more detail, in the method of FIG. 6, identifying (406) audio objects (408) in the legacy web page (408) for audio rendering includes identifying (602) display text for text to speech conversion. Display text is text that is displayed when the legacy web page is displayed in a conventional browser. Identifying (602) display text for text to speech conversion may be carried out in dependence upon markup in the legacy web page. Such markup may include tags identifying display text explicitly.

In the method of FIG. 6, selecting (418) audio events (420) for rendering the audio objects identified for audio rendering includes selecting (604) a text to speech event. A text to speech event is a software function that when executed converts text to speech.

In the method of FIG. 6, rendering (434), with the selected audio events (420) at their assigned playback times (430), the audio content of the each of the audio objects (408) identified for audio rendering includes converting (606) the display text to synthesized speech. Converting (606) the display text to synthesized speech may be carried out with a speech engine. Examples of speech engines capable of converting text to speech for recording in the audio portion of a multimedia file include, for example, IBM's ViaVoice® Text-to-Speech, Acapela Multimedia TTS, AT&T Natural Voices™ Text-to-Speech Engine, and Python's pyTTS class. Each of these text-to-speech engines is composed of a front end that takes input in the form of text and outputs a symbolic linguistic representation to a back end that outputs the received symbolic linguistic representation as a speech waveform.

Typically, speech synthesis engines operate by using one or more of the following categories of speech synthesis: articulatory synthesis, formant synthesis, and concatenative synthesis. Articulatory synthesis uses computational biomechanical models of speech production, such as models for the glottis and the moving vocal tract. Typically, an articulatory synthesizer is controlled by simulated representations of muscle actions of the human articulators, such as the tongue, the lips, and the glottis. Computational biomechanical models of speech production solve time-dependent, 3-dimensional differential equations to compute the synthetic speech output. Typically, articulatory synthesis has very high computational requirements, and has lower results in terms of natural-sounding fluent speech than the other two methods discussed below.

Formant synthesis uses a set of rules for controlling a highly simplified source-filter model that assumes that the glottal source is completely independent from a filter which represents the vocal tract. The filter that represents the vocal tract is determined by control parameters such as formant frequencies and bandwidths. Each formant is associated with a particular resonance, or peak in the filter characteristic, of the vocal tract. The glottal source generates either stylized glottal pulses or periodic sounds and generates noise for aspiration. Formant synthesis generates highly intelligible, but not completely natural sounding speech. However, formant synthesis has a low memory footprint and only moderate computational requirements.

Concatenative synthesis uses actual snippets of recorded speech that are cut from recordings and stored in an inventory or voice database, either as waveforms or as encoded speech. These snippets make up the elementary speech segments such as, for example, phones and diphones. Phones are composed of a vowel or a consonant, whereas diphones are composed of phone-to-phone transitions that encompass the second half of one phone plus the first half of the next phone. Some concatenative synthesizers use so-called demi-syllables, in effect applying the diphone method to the time scale of syllables. Concatenative synthesis then strings together, or concatenates, elementary speech segments selected from the voice database, and, after optional decoding, outputs the resulting speech signal. Because concatenative systems use snippets of recorded speech, they have the highest potential for sounding like natural speech, but concatenative systems require large amounts of database storage for the voice database.

Recasting Search Engine Results as a Motion Picture with Audio

Figure 7:
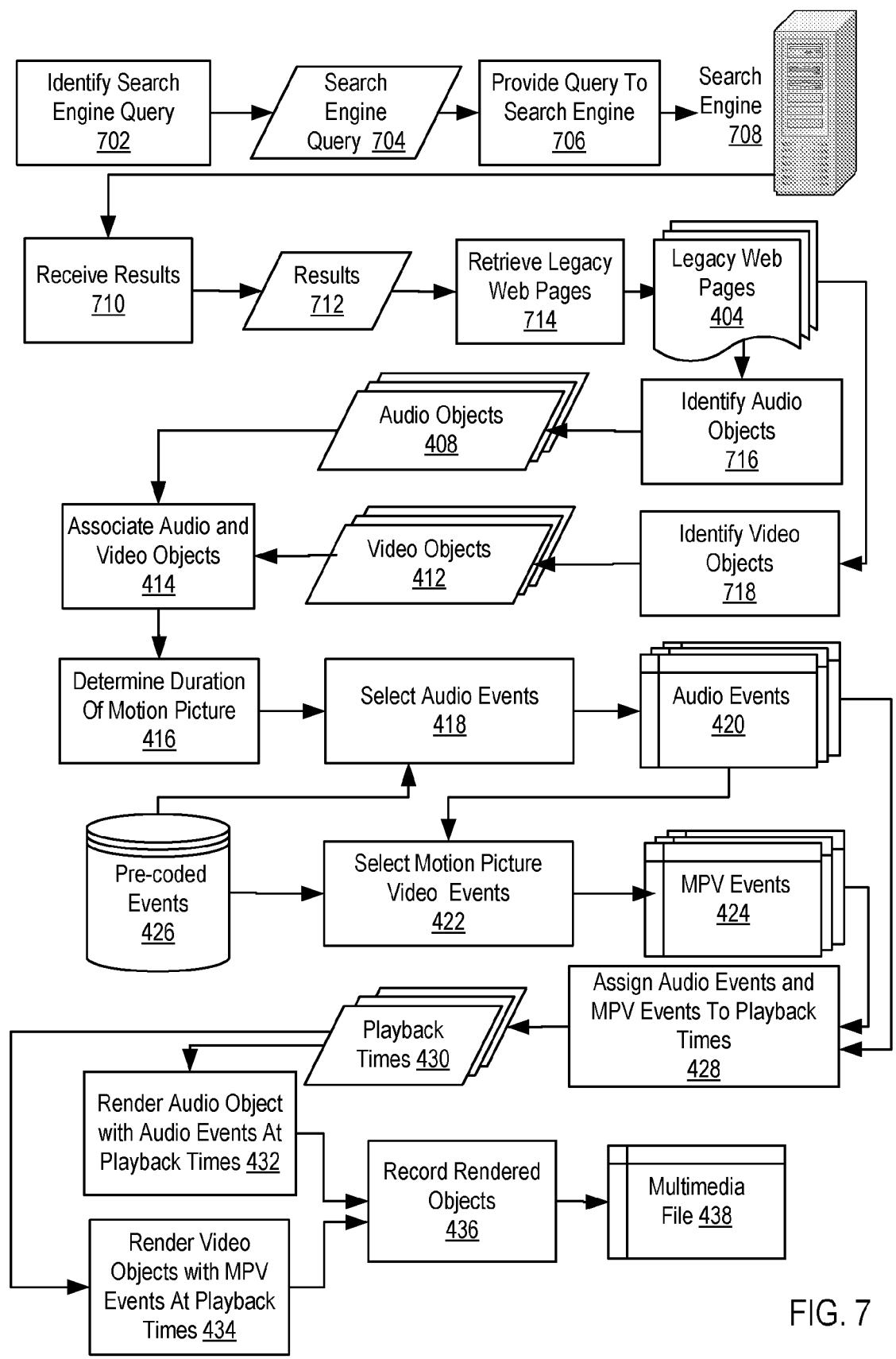
FIG. 7 sets forth a flow chart illustrating an exemplary computer-implemented method for recasting search engine results as a motion picture with audio.

For further explanation, FIG. 7 sets forth a flow chart illustrating an exemplary computer-implemented method for recasting search engine results as a motion picture with audio. A search engine is an information retrieval system designed to help find information stored on computer system, such as a computer on the World Wide Web, inside a corporate or proprietary network, or in a personal computer. The search engine allows a user to provide a search engine query and retrieves a list of resources that match the criteria of the search engine query. The list or resources is often sorted with respect to some measure of relevance of the search engine query. Search engines use regularly updated indexes to operate quickly and efficiently. Search engines useful in recasting search engine results as a motion picture with audio according to the present invention include Web search engines, which search for information on the World Wide Web, enterprise search engines, which search on intranets, personal search engines that search on individual computers, and others as will occur to those of skill in the art.

The method of FIG. 7 includes identifying (702) a search engine query (704). A search engine query is a set of selection criteria typically implemented as a set of keywords for use by search engine in selecting relevant resources.

Identifying (702) a search engine query (704) may be carried out by receiving a query from a user. A query may be received through for example a GUI text box designed to receive from users a search engine query. Such a query may include one or more keywords received from a user and to be provided to a search engine.

Identifying (702) a search engine query (704) also may be carried out by identifying metadata from a web page and creating a query from the metadata. In such cases, metadata may be included in a web page that identifies attributes of the web page, such as identifications of the subject matter of the web page, number of images in the web page, and others. In such an example, the metadata describing the web page may be parsed against search engine creation rules and used to create a search engine query. In such cases, recasting search engine results identified from metadata of a web page as a motion picture with audio results in a motion picture having attributes of the web page with additional content provided by the search engine results.

The method of FIG. 7 also includes providing (706) to a search engine (708) the query (704). Providing (706) to a search engine (708) the query (704) may be carried out by encoding the query in a uniform resource locator ('URL') invoking the search engine and invoking the data encoded URL. Examples of search engines useful in recasting search engine results as a motion picture with audio according to the present invention include search engines provided by Google, Yahoo Search, MSN Search and others as will occur to those of skill in the art.

The method of FIG. 7 also includes receiving (710) from the search engine (708) the results (712) of the query (704). Search engine results (712) are typically implemented as a list of identifications of resources prioritized as to relevance to the selection criteria of the query. The search engine results are often returned in a markup document viewable in a conventional web browser. The markup document typically includes a list of resources prioritized by relevance and hyperlinks to those resources.

The method of FIG. 7 also includes retrieving (714) a plurality of legacy web pages (404) in dependence upon the results (712). Retrieving (714) a plurality of legacy web pages (404) in dependence upon the results (712) may be carried out by invoking hyperlinks to the legacy web pages or retrieving URLs identifying the legacy web pages from the search engine results and invoking those URLs.

Search engines may often return in search engine results identifications of more legacy web pages than necessary to recast the search engine results as a motion picture with audio. For further explanation, therefore, FIG. 8 sets forth a flow chart illustrating an exemplary method for retrieving (714) a plurality of legacy web pages (404) in dependence upon the results (712) that reduces the overall number of legacy web pages used to recast the search engine results as a motion picture with audio. Retrieving (714) a plurality of legacy web pages (404) in dependence upon the results (712) according to the method of FIG. 8 includes retrieving (802) a predetermined number (808) of web pages (404) identified in the search results (712). As mentioned above, search engine results are typically prioritized by relevance. Retrieving (802) a predetermined number (808) of web pages (404) identified in the search results (712) may therefore carried out by retrieving first predetermined number of legacy web pages in the search results. The predetermined number may vary according to many factors such as target duration of the motion picture with video, subject matter of the motion picture with video and others. The predetermined number of legacy web pages to retrieved is typically large enough to provide ample material for the motion picture with video and yet small enough such that the video does not contain less relevant material and is not too long.

Figure 8:
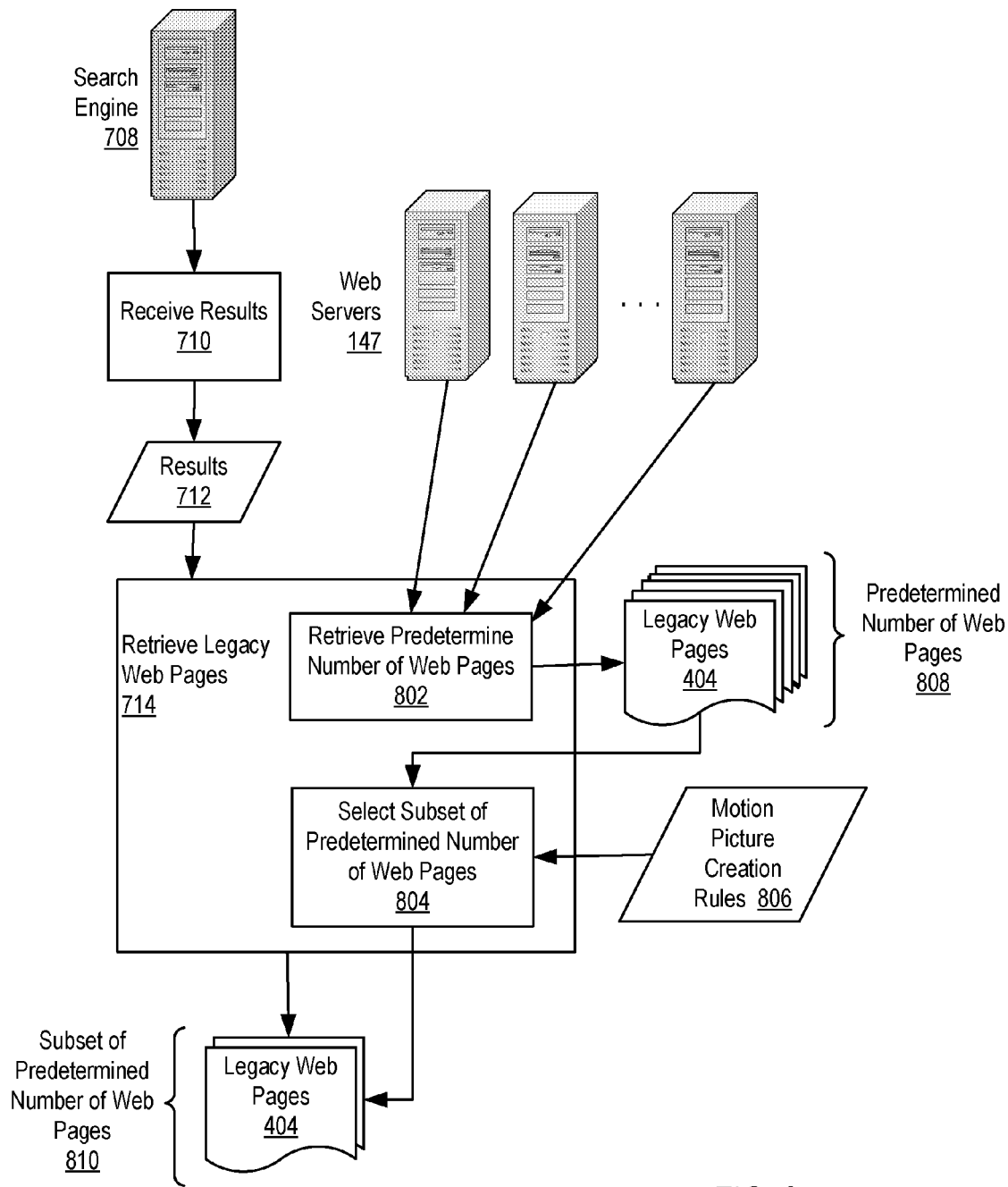
FIG. 8 sets forth a flow chart illustrating an exemplary method for retrieving a plurality of legacy web pages in dependence upon the results.

The method of FIG. 8 includes selecting (804) in dependence upon motion picture creation rules (806) a subset (810) of the retrieved predetermined number (808) of web pages (404). Motion picture creation rules (806) are rules designed to select one or more of the predetermined number of web pages to be recast as a motion picture with audio. For example, selecting in dependence upon motion picture creation rules a subset of the retrieved predetermined number of web pages may include determining the number of images in each web page of the predetermined number of web pages and selecting the subset of web pages with the highest number of images. Similarly, selecting in dependence upon motion picture creation rules a subset of the retrieved predetermined number of web pages may include determining the legacy web pages with the most words, or most occurrences of keywords, and selecting as the subset those legacy web pages.

Again with reference to FIG. 7: After retrieving (714) a plurality of legacy web pages (404) in dependence upon the results (712), the method of FIG. 7 continues by identifying (716) audio objects (408) in the plurality of legacy web pages (404) for audio rendering. As mentioned above, audio objects are objects typically identified in dependence upon markup in the legacy web pages, the content of which is to be rendered as audio in the motion picture recast of the search results. One example of an audio object useful in recasting search engine results as a motion picture with audio includes display text. Display text is text that is displayed when the legacy web page containing the text is displayed in a conventional browser. Such display text may be identified as an audio object and the text may be converted to synthesized speech and played as audio in the motion picture recast of the search results. Another example of audio objects includes audio files contained in one or the legacy web pages of the search results. Such audio files may be extracted and included as audio in the motion picture recast of the search results.

Identifying (716) audio objects (408) in the plurality of legacy web pages (404) for audio rendering may be carried out in a manner similar to identifying audio objects in the legacy web page for audio rendering as described above with reference to FIG. 4. The distinction between identifying (716) audio objects (408) in the plurality of legacy web pages (404) for audio rendering in the method of FIG. 7 and identifying audio objects in the legacy web page for audio rendering as described above with reference to FIG. 4 is that in the method of FIG. 7 audio objects are identified in more than one legacy web page. Identifying (716) audio objects (408) in the plurality of legacy web pages (404) for audio rendering may be carried out in dependence upon markup in one or more of the legacy web pages. Such markup may include tags identifying audio files, display text, and other objects. Markup may also provide some context to the display text by identifying the text as a heading, a paragraph, and so on. Identifying (716) audio objects (408) in the plurality of legacy web pages (404) for audio rendering may therefore be carried out by parsing the markup of the legacy web pages and identifying objects in the legacy web pages as audio objects in dependence upon the markup of the legacy web pages and audio object identification rules. Audio object identification rules are rules designed to identify as audio objects particular display text in the legacy web pages for audio rendering in the motion picture recast of the search engine results such as headings, paragraphs, tag lines, and so on.

The method of FIG. 7 also includes identifying (718) video objects (412) in the plurality of legacy web pages (404) for motion picture rendering. As mentioned above, video objects are objects also typically identified in dependence upon markup in the legacy web pages of the search engine results, the content of which is to be rendered as video, often motion picture video, in the motion picture recast of the search engine results. Examples of video objects include images and display text that may be rendered with video events to effect motion picture in the recast of the search engine results.

Identifying (718) video objects (412) in the plurality of legacy web pages (404) for motion picture rendering may be carried out in a manner similar to identifying video objects in a legacy web page described above with reference to FIG. 4. The distinction between identifying (718) video objects (412) in the plurality of legacy web pages (404) for motion picture rendering according to the method of FIG. 7 and identifying video objects in a legacy web page described above with reference to FIG. 4 is that in the method of FIG. 7 video objects are identified in more than one web page for the recast of the search engine results. Identifying (718) video objects (412) in the plurality of legacy web pages (404) may be carried out in dependence upon markup in the legacy web pages. Such markup may include tags identifying image files, display text, and other objects that may be rendered with video events to effect motion picture. Markup may also provide some context to the display text by identifying the text as a heading, a paragraph, and so on. Identifying (718) video objects (412) in the plurality of legacy web pages (404) may therefore be carried out by parsing the markup of the legacy web pages in the search results and identifying objects in the legacy web pages as video objects in dependence upon the markup of the legacy web pages and video object identification rules. Video object identification rules are rules designed to identify as video objects particular images, display text, and other content in the legacy web pages for motion picture video rendering in the motion picture recast of the search engine results.

Having identified the audio objects (408) in the plurality of legacy web pages (404) for audio rendering and the video objects (412) in the plurality of legacy web pages (404) for motion picture rendering, the method of FIG. 7 continues in the same manner as the method of FIG. 4. That is, the method of FIG. 7 includes associating (414) one or more of the video objects (412) for motion picture rendering with one or more of the audio objects (408) for audio rendering; determining (416) in dependence upon the selected audio objects (408) and video objects (412) a duration for the motion picture; selecting (418) audio events (420) for rendering the audio objects (408) identified for audio rendering; selecting (422) motion picture video events (424) for rendering the video objects (412) identified for motion picture rendering; assigning (428) the selected audio events (420) and the selected motion picture video events (424) to playback times for the motion picture; rendering (432), with the selected audio events (420) at their assigned playback times, the audio content of the each of the audio objects (408) identified for audio rendering; rendering (434), with the selected motion picture video events (424) at their assigned playback times, the video content of the video objects (412) identified for motion picture rendering; and recording (436) in a multimedia file the rendered audio content and motion picture video content.

Exemplary embodiments of the present invention are described largely in the context of a fully functional computer system for recasting a legacy web page as a motion picture with audio and recasting search engine results as a motion picture with audio. Readers of skill in the art will recognize, however, that the present invention also may be embodied in a computer program product disposed on computer-readable signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets and networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A computer-implemented method for recasting search engine results as a motion picture with audio, the method comprising:
    identifying a search engine query;
    providing to a search engine the query;
    receiving from the search engine the results of the query;
    retrieving a plurality of legacy web pages in dependence upon the results;
    identifying audio objects in the plurality of legacy web pages for audio rendering;
    identifying video objects in the plurality of legacy web pages for motion picture rendering;
    associating one or more of the video objects for motion picture rendering with one or more of the audio objects for audio rendering; wherein associating one or more of the objects for motion picture rendering with one or more of the objects for audio rendering further comprises:
        determining layout locations of the identified objects in the legacy web page identified for audio rendering;
        determining layout locations of identified objects in the legacy web page identified for motion picture video rendering; and
        associating one or more objects for motion picture video rendering with objects for audio rendering in dependence upon their layout locations;
    determining in dependence upon the selected audio objects and video objects a duration for the motion picture;
    selecting audio events for rendering the audio objects identified for audio rendering;
    selecting motion picture video events for rendering the video objects identified for motion picture rendering;
    assigning the selected audio events and the selected motion picture video events to playback times for the motion picture;
    rendering, with the selected audio events at their assigned playback times, the audio content of the each of the audio objects identified for audio rendering;
    rendering, with the selected motion picture video events at their assigned playback times, the video content of the video objects identified for motion picture rendering; and
    recording in a multimedia file the rendered audio content and motion picture video content.

2. The method of claim 1 wherein identifying a search engine query further comprises receiving a query from a user.

3. The method of claim 1 wherein identifying a search engine query further comprises:
    identifying metadata from a web page; and
    creating a query from the metadata.

4. The method of claim 1 wherein retrieving a plurality of legacy web pages in dependence upon the results further comprises:
    retrieving a predetermined number of web pages identified in the search results; and
    selecting in dependence upon motion picture creation rules a subset of the retrieved predetermined number of web pages.

5. The method of claim 4 wherein selecting in dependence upon motion picture creation rules a subset of the retrieved predetermined number of web pages further comprises:
    determining the number of images in each web page of the predetermined number of web pages; and
    selecting the subset of web pages with the highest number of images.

6. An system, including a processor, for recasting search engine results as a motion picture with audio, the system comprising:
    means for identifying a search engine query;
    means for providing to a search engine the query;
    means for receiving from the search engine the results of the query;
    means for retrieving a plurality of legacy web pages in dependence upon the results;
    means for identifying audio objects in the plurality of legacy web pages for motion picture rendering;
    means for associating one or more of the video objects for motion picture rendering with one or more of the audio objects for audio rendering; wherein means for associating one or more of the objects for motion picture rendering with one or more of the objects for audio rendering further comprises:
        means for determining layout locations of the identified objects in the legacy web page identified for audio rendering;

means for determining layout locations of identified objects in the legacy web page identified for motion picture video rendering;
means for associating one or more objects for motion picture video rendering with objects for audio rendering in dependence upon their layout locations;
means for determining in dependence upon the selected audio objects and video objects a duration for the motion picture;
means for selecting audio events for rendering the audio objects identified for audio rendering;
means for selecting motion picture video events for rendering the video objects identified for motion picture rendering;
means for assigning the selected audio events and the selected motion picture video events to playback times for the motion picture;
means for rendering, with the selected audio events at their assigned playback times, the audio content of the each of the audio objects identified for audio rendering;
means for rendering, with the selected motion picture video events at their assigned playback times, the video content of the video objects identified for motion picture rendering; and
means for recording in a multimedia file the rendered audio content and motion picture video content.

7. The system of claim 6 wherein means for identifying a search engine query further comprises means for receiving a query from a user.

8. The system of claim 6 wherein means for identifying a search engine query further comprise:
means for identifying metadata from a web page; and
means for creating a query from the metadata.

9. The system of claim 6 wherein means for retrieving a plurality of legacy web pages in dependence upon the results further comprise:
means for retrieving a predetermined number of web pages identified in the search results; and
means for selecting in dependence upon motion picture creation rules a subset of the retrieved predetermined number of web pages.

10. The system of claim 9 wherein means for selecting in dependence upon motion picture creation rules a subset of the retrieved predetermined number of web pages further comprise:
means for determining the number of images in each web page of the predetermined number of web pages; and
means for selecting the subset of web pages with the highest number of images.

11. A computer program product for recasting search engine results as a motion picture with audio, the computer program product disposed upon a non-transmission computer-readable medium, the computer program product comprising computer program instructions capable of:
identifying a search engine query;
providing to a search engine the query;
receiving from the search engine the results of the query;
retrieving a plurality of legacy web pages in dependence upon the results;
identifying audio objects in the plurality of legacy web pages for audio rendering;
identifying video objects in the plurality of legacy web pages for motion picture rendering;
associating one or more of the video objects for motion picture rendering with one or more of the audio objects for audio rendering; wherein associating one or more of the objects for motion picture rendering with one or more of the objects for audio rendering further comprises:
determining layout locations of the identified objects in the legacy web page identified for audio rendering;
determining layout locations of identified objects in the legacy web page identified for motion picture video rendering; and
associating one or more objects for motion picture video rendering with objects for audio rendering in dependence upon their layout locations;
determining in dependence upon the selected audio objects and video objects a duration for the motion picture;
selecting audio events for rendering the audio objects identified for audio rendering;
selecting motion picture video events for rendering the video objects identified for motion picture rendering;
assigning the selected audio events and the selected motion picture video events to playback times for the motion picture;
rendering, with the selected audio events at their assigned playback times, the audio content of the each of the audio objects identified for audio rendering;
rendering, with the selected motion picture video events at their assigned playback times, the video content of the video objects identified for motion picture rendering; and
recording in a multimedia file the rendered audio content and motion picture video content.

12. The computer program product of claim 11 wherein computer program instructions capable of identifying a search engine query further comprises computer program instructions capable of receiving a query from a user.

13. The computer program product of claim 11 wherein computer program instructions capable of identifying a search engine query further comprise computer program instructions capable of:
identifying metadata from a web page; and
creating a query from the metadata.

14. The computer program product of claim 11 wherein computer program instructions capable of retrieving a plurality of legacy web pages in dependence upon the results further comprise computer program instructions capable of:
retrieving a predetermined number of web pages identified in the search results; and
selecting in dependence upon motion picture creation rules a subset of the retrieved predetermined number of web pages.

15. The computer program product of claim 14 wherein computer program instructions capable of selecting in dependence upon motion picture creation rules a subset of the retrieved predetermined number of web pages further comprise computer program instructions capable of:
determining the number of images in each web page of the predetermined number of web pages; and
selecting the subset of web pages with the highest number of images.

16. A computer-implemented method for recasting search engine results as a motion picture with audio, the method comprising:
identifying a search engine query;
providing to a search engine the query;
receiving from the search engine the results of the query;
retrieving a plurality of legacy web pages in dependence upon the results; wherein retrieving a plurality of legacy web pages in dependence upon the results further comprises:

retrieving a predetermined number of web pages identified in the search results; and selecting in dependence upon motion picture creation rules a subset of the retrieved predetermined number of web pages;

identifying audio objects in the plurality of legacy web pages for audio rendering;

identifying video objects in the plurality of legacy web pages for motion picture rendering;

associating one or more of the video objects for motion picture rendering with one or more of the audio objects for audio rendering, determining in dependence upon the selected audio objects and video objects a duration for the motion picture;

selecting audio events for rendering the audio objects identified for audio rendering;

selecting motion picture video events for rendering the video objects identified for motion picture rendering; wherein selecting in dependence upon motion picture creation rules a subset of the retrieved predetermined number of web pages further comprises:

determining the number of images in each web page of the predetermined number of web pages; and selecting the subset of web pages with the highest number of images;

assigning the selected audio events and the selected motion picture video events to playback times for the motion picture;

rendering, with the selected audio events at their assigned playback times, the audio content of the each of the audio objects identified for audio rendering;

rendering, with the selected motion picture video events at their assigned playback times, the video content of the video objects identified for motion picture rendering; and recording in a multimedia file the rendered audio content and motion picture video content.

* * * * *